United States Patent [19]
Tsuda

[11] 3,714,844
[45] Feb. 6, 1973

[54] STEERING WHEEL CONSISTING OF A LIGHT FRAME INTEGRALLY MOULDING, PROCESSED FROM A FLAT PLATE

[75] Inventor: Jo Tsuda, Aichi-ken, Japan

[73] Assignee: Masakazu Inagaki, Aichi-ken, Japan

[22] Filed: Jan. 22, 1971

[21] Appl. No.: 108,935

[30] Foreign Application Priority Data

| Jan. 27, 1970 | Japan | 45/7488 |
| Aug. 31, 1970 | Japan | 45/76577 |
| Aug. 31, 1970 | Japan | 45/76578 |
| Aug. 31, 1970 | Japan | 45/76579 |
| Aug. 31, 1970 | Japan | 45/76580 |
| Aug. 31, 1970 | Japan | 45/76581 |

[52] U.S. Cl. ............................................. 74/552
[51] Int. Cl. ........................................... B62d 1/04
[58] Field of Search ..................... 74/552; 29/159 B

[56] References Cited

UNITED STATES PATENTS

| D167,604 | 9/1952 | Baldwin | 74/552 X |
| 1,140,943 | 5/1915 | Bjorn | 29/159 B X |
| 1,785,897 | 12/1930 | Geyer | 29/159 B |
| 1,843,676 | 2/1932 | Husted | 74/552 |
| 1,858,650 | 5/1932 | Weida | 74/552 |
| 1,915,769 | 6/1933 | Thomas | 74/552 |
| 2,041,738 | 5/1936 | Beck | 74/552 |
| 2,206,431 | 7/1940 | Schoenbechler | 74/552 |
| 3,209,615 | 10/1965 | Fosnaugh et al. | 74/552 |
| 3,576,141 | 4/1971 | Brilmyer | 74/552 |

*Primary Examiner*—Milton Kaufman
*Assistant Examiner*—F. D. Shoemaker
*Attorney*—George B. Oujevolk

[57] ABSTRACT

A steering wheel for a motor vehicle having a frame with ring, spoke and boss portions. The spoke portion has cuts to absorb mechanical shocks. The ring, spoke and boss portions define a space to enclose required driving instruments and at least a part of the ring portion is coated with covering material. The ring portion is noncircular and the steering wheel spokes enclose an air bag therein.

2 Claims, 57 Drawing Figures

Fig. 13 B
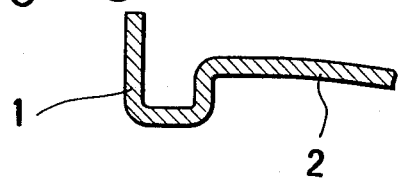
Fig. 13 C
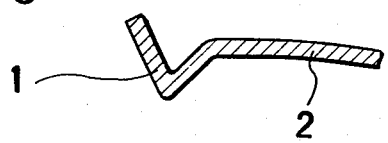
Fig. 13 D
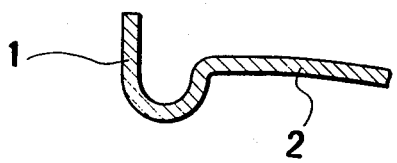
Fig. 13 E
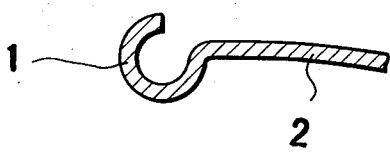
Fig. 13 G
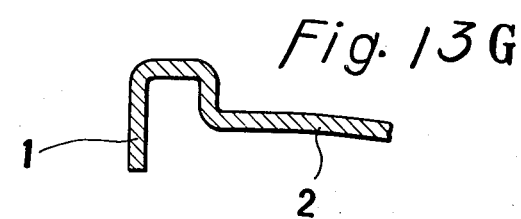
Fig. 13 H
Fig. 13 I
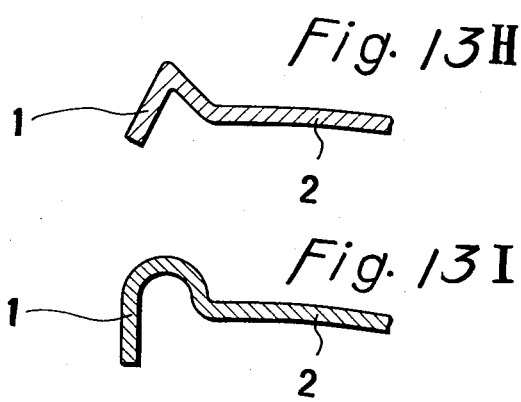
Fig. 13 J
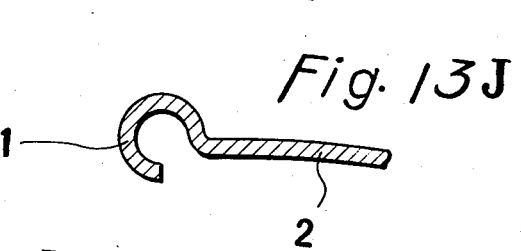
Fig. 13 K
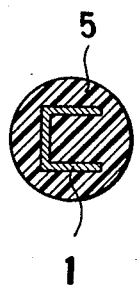
Fig. 13 L
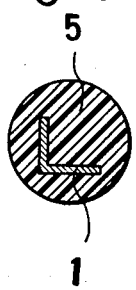
Fig. 13 M
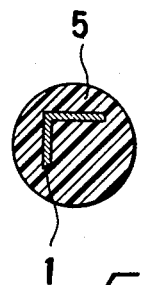
Fig. 13 A
Fig. 13 N
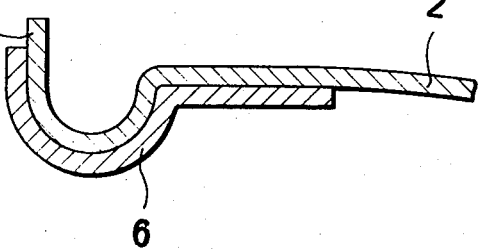
Fig. 13 F
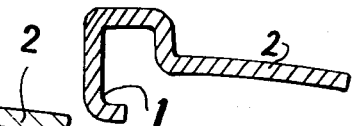

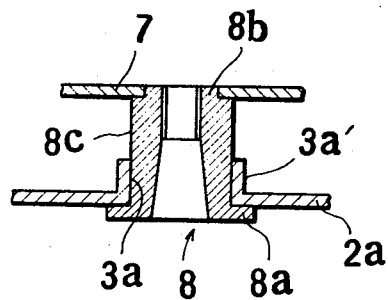
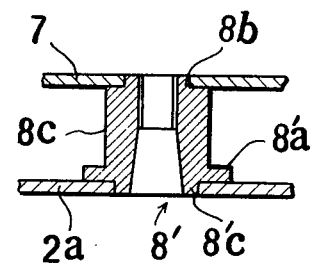
Fig. 14D  Fig. 14E
Fig. 14F
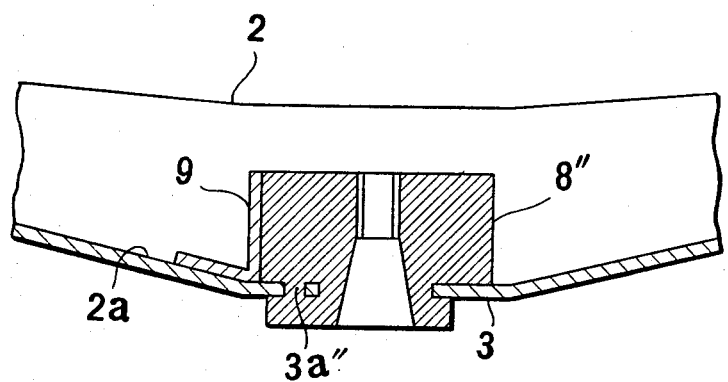
Fig. 15
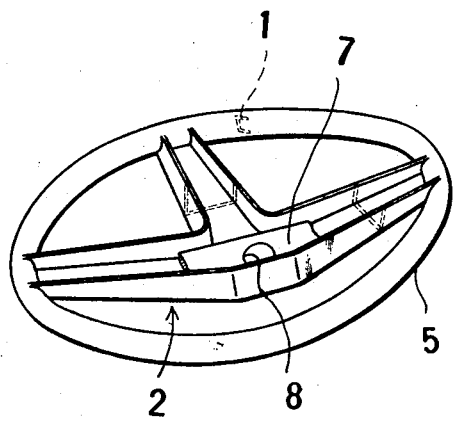

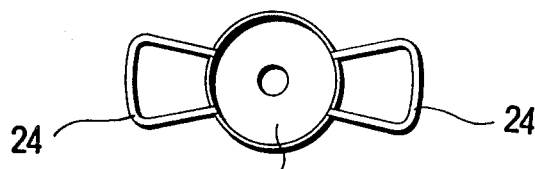
Fig. 29A
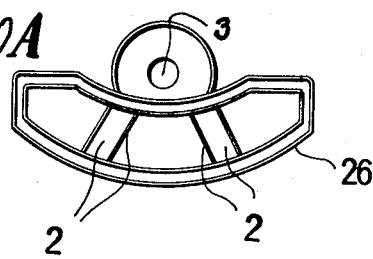
Fig. 30A
Fig. 29B
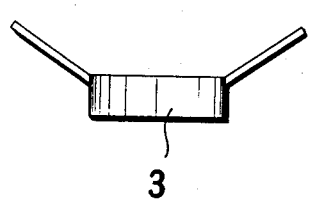
Fig. 30B
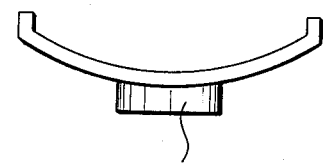
Fig. 31A
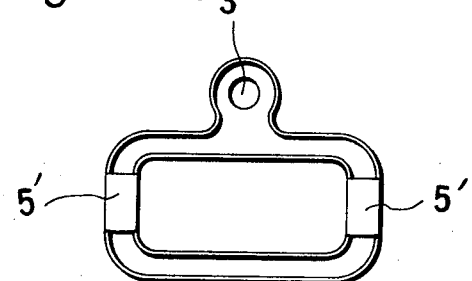
Fig. 32A
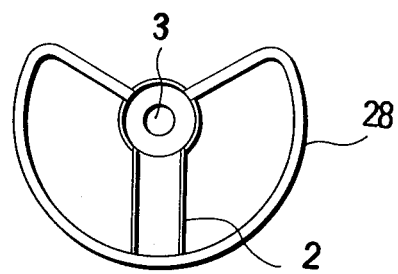
Fig. 31B
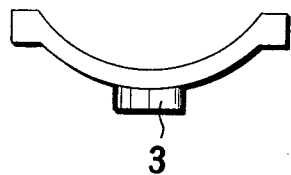
Fig. 32B
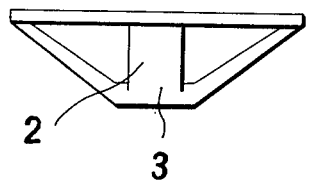
Fig. 33A
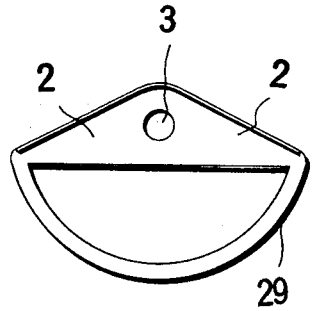
Fig. 33B 3,714,844

STEERING WHEEL CONSISTING OF A LIGHT FRAME INTEGRALLY MOULDING, PROCESSED FROM A FLAT PLATE

BACKGROUND OF THE INVENTION

This invention relates to a steering wheel of a motor vehicle, and specifically to a frame of a steering wheel of a new shape.

BRIEF DESCRIPTION OF THE PRIOR ART

Heretofore, the structure of the steering wheel has been such that the ring, spoke and the boss portions were first formed separately, and then these three portions were made integral by welding; or else, a die-cast boss in which the spoke and the boss were integrally die-cast and welded together with the ring, and on the exterior of the formed frame resin was mould processed, thus finishing the manufacture of the steering wheel. However, the steering wheel with the frame made by this system has many disadvantages, for example:

1. The structure of the frame being complicated, many manufacturing processes were needed.
2. The wheel was twisted and stress took place, due to the rolling and bending process of the ring portion and also due to the residual stress of the welding at the spoke portion, which necessitated the correcting or restoring process because of the stress existing during the time of the manufacturing process.
3. Structurally, it has been difficult to decrease the weight of the steering wheel.
4. Because of the reasons mentioned above in items 1 through 3, the production efficiency has been low, and it has been difficult to establish a mass-production system to keep the production cost down.
5. Notwithstanding the restoring process hereinbefore described in Item 2, the residual stress which took place at the time of various processes applied to various parts of the frame, acted together with the external forces, i.e., the steering force which induced further distortion and the peeling off of the resin of the steering wheel.
6. The ring having a simple shape in cross-section, the peeling off of the coated resin around the ring, and the "slip" phenomena and subsequent cracks in the resin took place, due to the acting external force.
7. The ring having a simple shape in cross-section, "the spring effect" of the ring has been induced, resonant to the vibration of the body of the car.
8. Again, the ring having a simple shape in cross-section, a deformation (irregularity) of the ring within the metallic mold and a dislocation of the prescribed position for the fixing of the resin took place, due to the intensity of the extruding pressure of the resin at the time of its (the resin) moulding.
9. There has been some measurement or dimensional limit in the design of the steering handle, as the shape of the cross-section of the grip portion of the steering wheel is restricted to some extent, due to the simple shape or form in the wheel cross-section.
10. There has been the possibility, in case of a car collision, that the spoke would stab the driver when the welded portion of the steering frame was destroyed and came apart.

OBJECTS OF THE INVENTION

The principal object of this invention is to provide a steering wheel frame which will avoid the various disadvantages above mentioned, and another object is to realize a mass production system without requiring any correcting or restoring process.

The first characteristics of this invention is to provide a shock-absorbing device and an air-bag enclosing device, which are necessary for safety and at the same time with the moulding process of the steering wheel frame.

The second characteristic of this invention is to manufacture a steering wheel, which is shaped differently from the present fully circular wheel, and which may be adopted in the future, in accordance with the development of the structure of future motor vehicles.

Other objects and advantages of the invention will be better understood from the following detailed explanation of the invention, when considered together with the accompanying drawings, in which;

BRIEF EXPLANATIONS OF THE DRAWINGS

FIGS. 13A through 13N show various cross-sectional views of the ring portion;

FIGS. 14A through 14F show cross-sectional views of the means to mount the boss;

FIG. 15 shows an oblique view of the steering wheel of an embodiment in which a boss has been mounted;

FIGS. 16 through 19 show plan views of an embodiment of the shock-absorbing device, while

FIGS. 29A through 33A show various shapes of the finished frames of the steering wheel contemplated herein in plan view, while FIGS. 29B through 33B show front views of the corresponding steering wheels.

THE DETAILED EXPLANATION OF THE INVENTION

Figure 1:
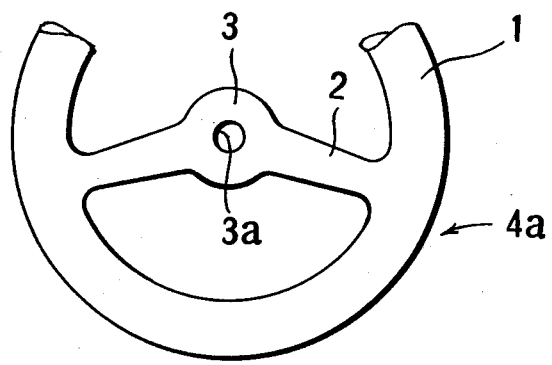
FIGS. 1 through 4 show plan views of the flat basic materials with the corresponding portions of the rings, the spokes and the boss portions integrally punched out of metallic plate.
Figure 2:
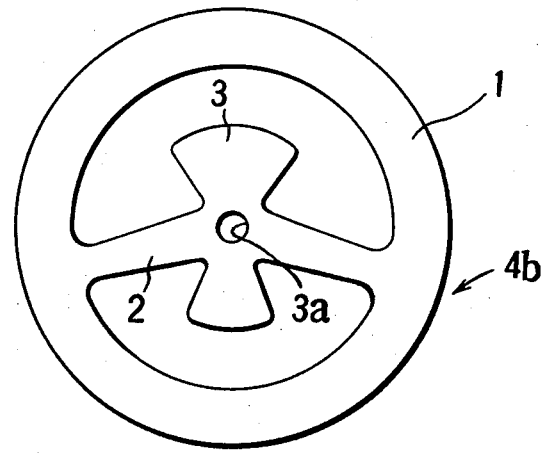
Figure 3:
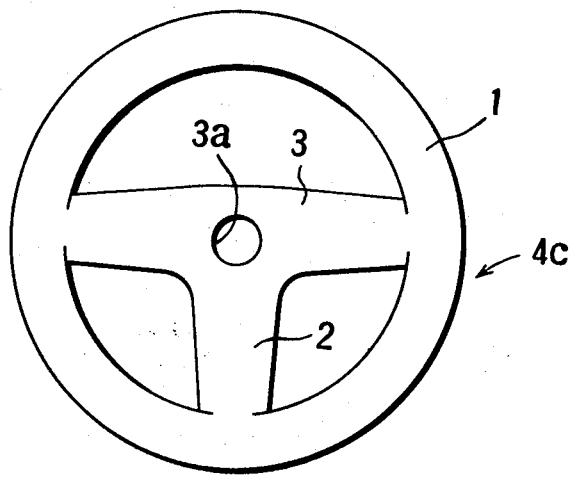
Figure 4:
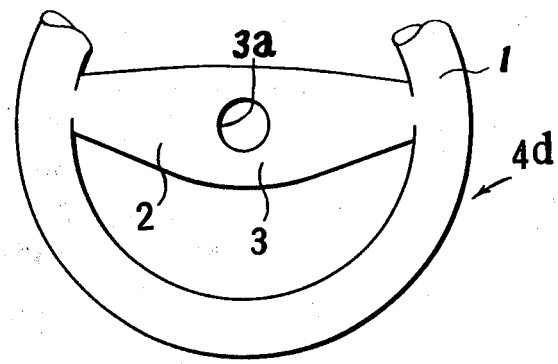
Figure 5:
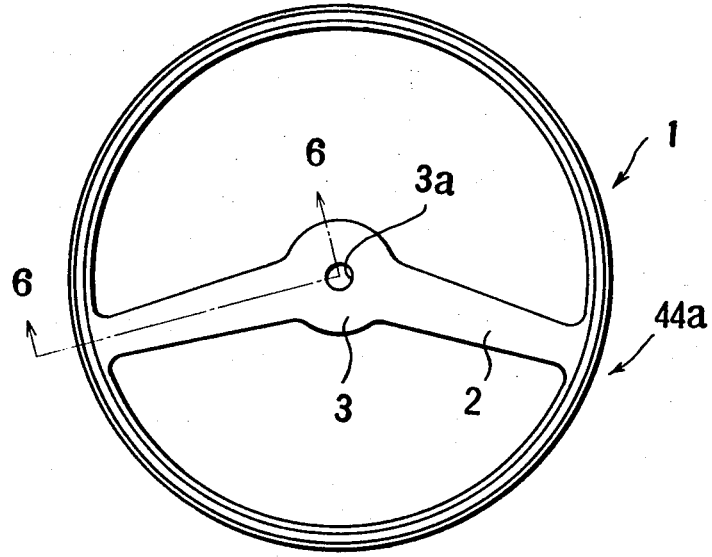
FIG. 5 shows a plan view of a finished frame with the moulding or the drawing process performed on the material shown in FIG. 1.

The structure of the light frames used in making the steering wheels shown in the drawings is as follows:

The ring portion 1, the spoke portion 2, the boss portion 3 and the boss hole 3a where the boss 8 is inserted, are integrally punched out of a metallic flat plate, thus producing the flat basic materials 4a, 4b, 4c and 4d, as shown in FIGS. 1 through 4 respectively. Next, these flat basic materials are subjected to the next press process or drawing process, and integral and finished frames of the steering wheel, 44a, 44b, 44c and 44d are thus formed, as shown in FIGS. 5, 7, 9 and 11. By these processes, the ring portion 1 can be moulded into many optional shapes, the cross-sections being bent, curved or segmental circular, as shown in FIG. 13. In this case, the ring portion 1, the spoke portion 2 and the boss portion 3 are moulded so as to satisfy the relative measures, sizes and shapes of the corresponding portions, and then the plastic material 5 is extruded and moulded on the ring portion 1, thus the ring portion is buried and enclosed in the covering, completing the grip portion of the ring; and when necessary, the exterior of the said covering material is coated with another material. The plastic covering 5 is fastened tightly to the frame of the ring portion 1 according to the shape of the cross-section of the ring portion 1, thus preventing the plastic covering from slipping around the ring portion 1. Also, in order to reinforce the place where the ring portion 1 and the spoke portion are connected, a reinforcing material 6 may be applied, as shown in FIG. 13N, thus increasing the cross-sectional coefficient.

Figure 6:
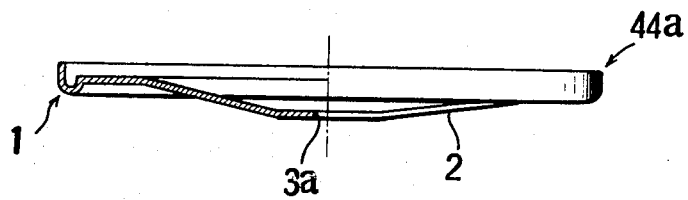
FIG. 6 shows a front view of the wheel in the cross-section cut by the line 6 — 6 in FIG. 5.
Figure 7:
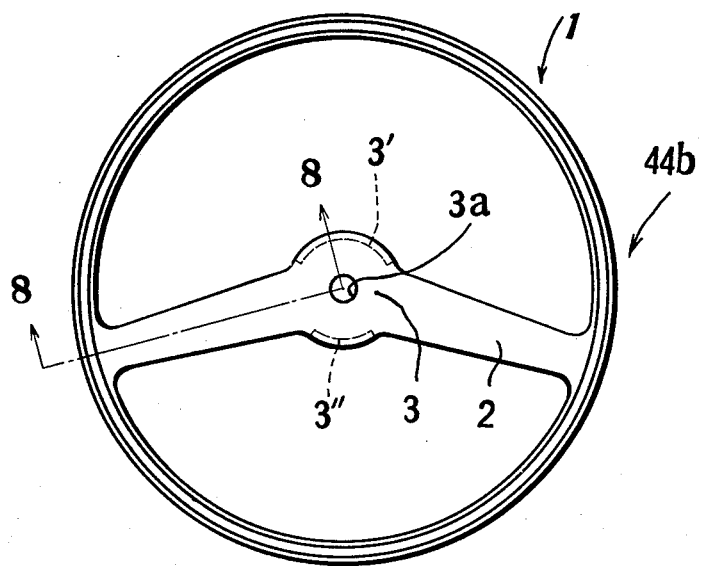
FIG. 7 shows a finished frame with the moulding process applied to the material in FIG. 2.
Figure 14A:
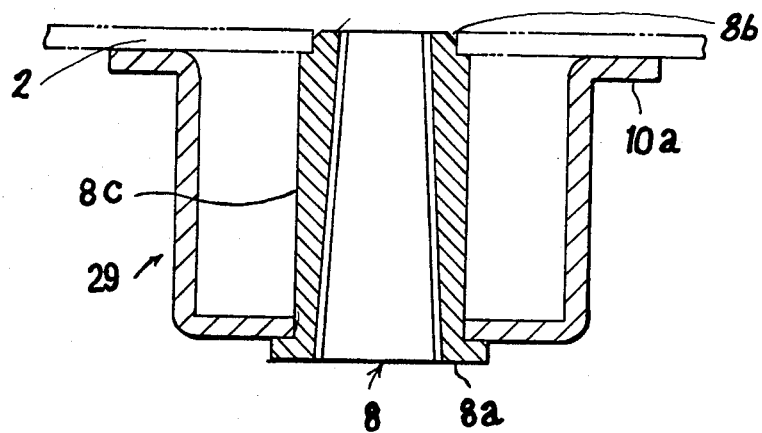
Figure 14B:
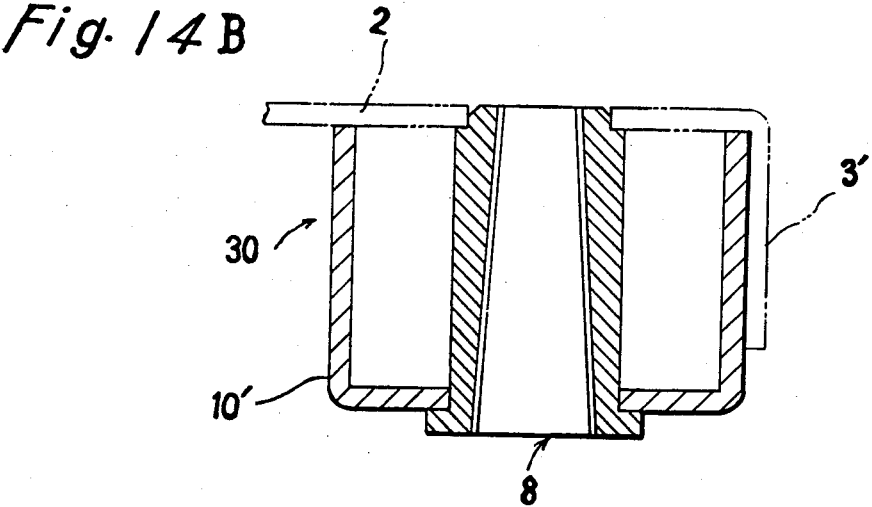

The shape of the cross-section of the spoke portion 2 may be formed concave or convex to increase the cross-sectional coefficient; while, in case when the mounting and installing of accessory devices necessary for driving, or mounting of a safety device, on the spoke, is taken into consideration, it is desirous to mould the spoke into a shape whose cross-section is curved or bent with a required space; this is shown in FIG. 15. The boss 8 to be mounted on the steering wheel is serrated or key-way processed prior to mounting; a flange 8a is formed at one end of the cylinder portion 8c of the boss, whose diameter is approximately equal to that of the boss hole 3a, i.e., the hole for the boss 8 into which the boss 8 is to be thrust; while at the other end of cylinder portion 8c of boss 8 a stepped portion 8b is formed, whose diameter is smaller than that of the cylinder 8c. In case the boss portion 3 has no boss enclosing case of housing, as seen in the finished steering wheel frames shown in FIGS. 6 and 7, a cup-shaped case having a flange 10a at the upper end and a hole at the bottom, the mould processed from the plate is mounted on the lower surface of the spoke, around the boss-hole 3a, by means of welding, etc. The flange 10a and the lower surface of the spoke are welded together as shown in FIG. 14A. FIG. 14B shows a cup-shaped case 10' having no flange, and mounted therein by the same means as above; the bent portion 3' of the two-dot-chain line shows the bent flange 3' of the boss portion in FIG. 7, as an example, where the spoke portion does not pass.

Figure 8:
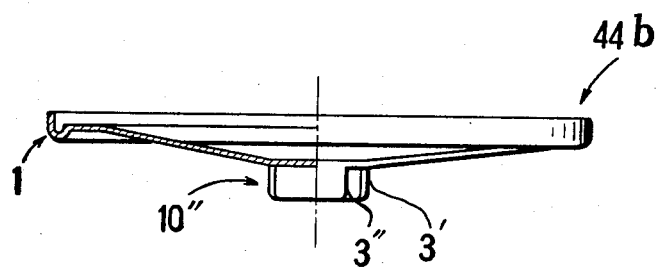
FIG. 8 shows a front view of a wheel in the cross-section cut by the line 8 — 8 in FIG. 7.
Figure 9:
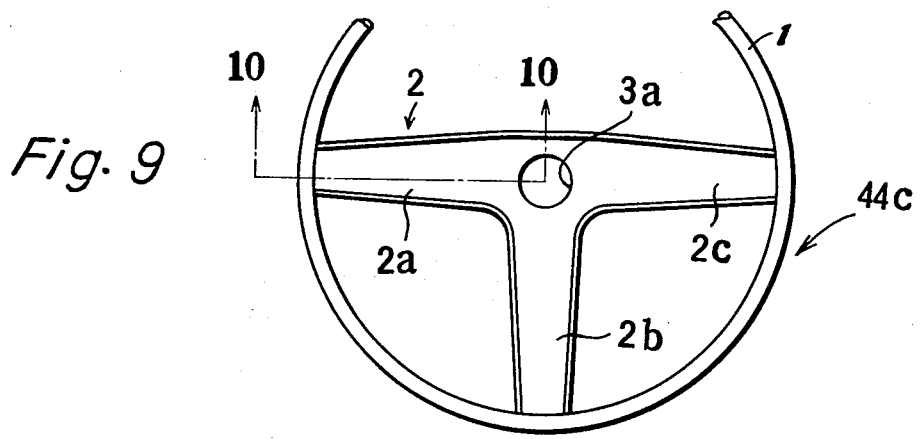
FIG. 9 shows a plan view of a finished frame made of material shown in FIG. 3.
Figure 10:
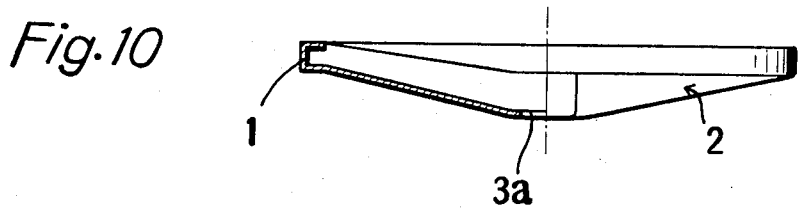
FIG. 10 shows a front view of a wheel in the cross-section cut by the line 10 — 10 in FIG. 9.
Figure 11:
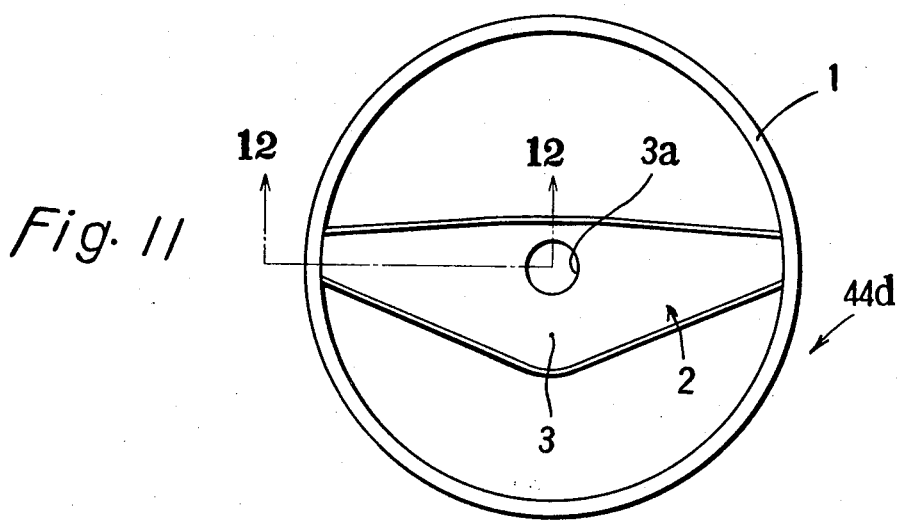
FIG. 11 shows a plan view of a finished frame made of the material shown in FIG. 4.
Figure 12:
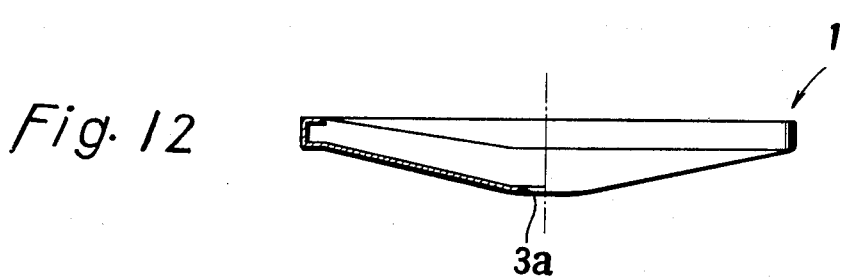
FIG. 12 shows a front view of the wheel in the cross-section cut by the line 12 — 12 in FIG. 11.

The boss 8, the cases 10 and 10' are welded and made integral, as the complete boss 29 or 30, prior to the final constructing or mounting process, as shown in FIGS. 14A and 14B. In this case, a cut is made in the case 10 or 10', and resin may be filled in the hollow space in the interior of the case. In case of the steering wheel shown in FIGS. 7 and 8, the flanges 3' and 3" may be formed in the boss portion by moulding the frame, bent downward and protruding below the spoke, thus forming a case or housing 10", and by placing the boss in the case 10" and putting the upper end of the boss into the boss hole 3a, the boss and the frame may be welded rigidly.

Figure 14C:
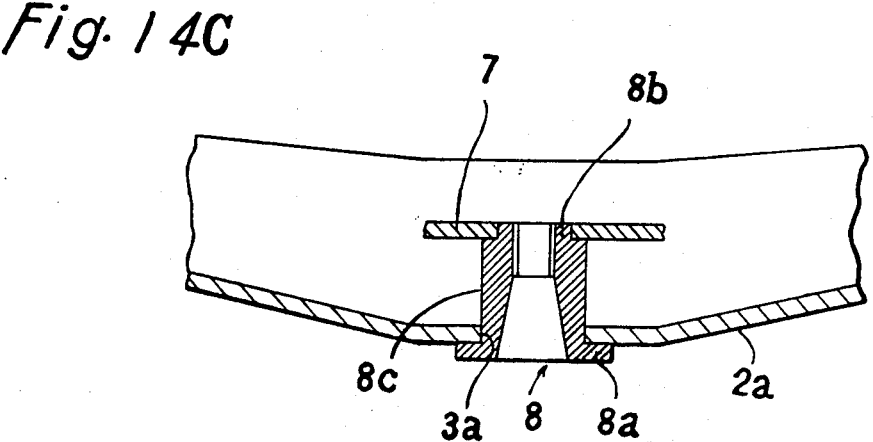

In this case, too, resin may be filled in the hollow between the case and the boss. FIG. 14C shows that the boss 8 is pushed into the bottom part 2a of the cross-section of the spoke until the flange 8a of the boss 8 is fixed fast therewith; then the boss 8 is fixed rigidly by welding the flange 8a and the said curved bottom part 2a of the spoke, together. On the upper end of the boss a material 7, which has a hole to fit into the stepped portion 8b, and both ends or the periphery of the said material 7 may be welded to the curved bottom 2a of the spoke or to the inner side walls, i.e., bent upwards, of the spoke. Instead of using material 7, a part of the side walls of the spoke may be made to be folded to engage in stepped part 8b of the boss. FIG. 14D shows an example to make the fastening of the boss 8 to the bottom 2a of the spoke more rigid, whereby a flange 3a' is formed protruding upwards, along the margin of the hole 3a of the spoke.

In FIG. 14E, the boss 8' has a stepped portion 8'c at the lower end of the boss flange 8'a, so that stepped portion 8'c may engage the boss hole 3a; in this case the stepped portion 8'c is pushed into the hole 3a, applying stepped portion 8'c from above the spoke, until the flange 8'a is fixed on the inner bottom of the spoke; otherwise, the fastening means is the same as previously mentioned. FIG. 14F shows an example, in which a boss 8" is made by a die-cast method, or by pouring molten metal into the boss hole 3a of the spoke; in case the boss 8" is made with a solidified metal, the whole or a part of the circumference of the boss 8" may be connected to the spoke by dint of a piece of metal 9 so that the solidified metal may be fastened more rigidly; or else, in order to fix the solidified metal to the spoke more rigidly, a plurality of small holes 3a" may be made around the boss hole 3a of the spoke, so that the cast-in metal may be integrally reinforced, and the structure and mounting may become more effective. Here, in case of the cast-in boss 8", the serration or key-way process is performed at the time when the boss is mounted to the spoke.

Figure 16:
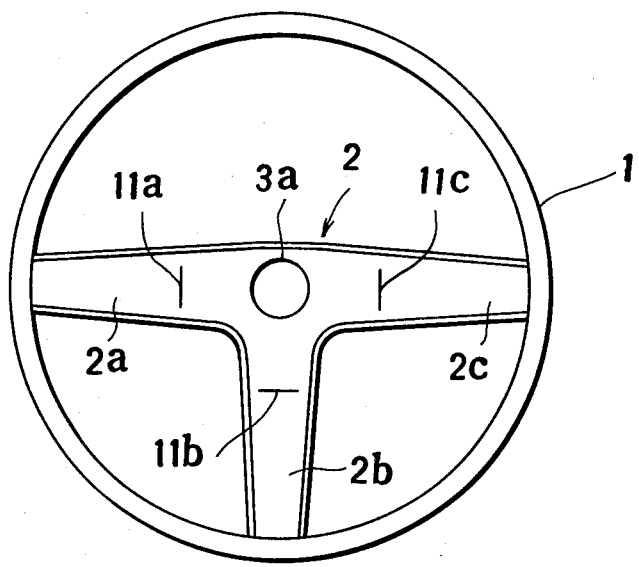
Figure 17:
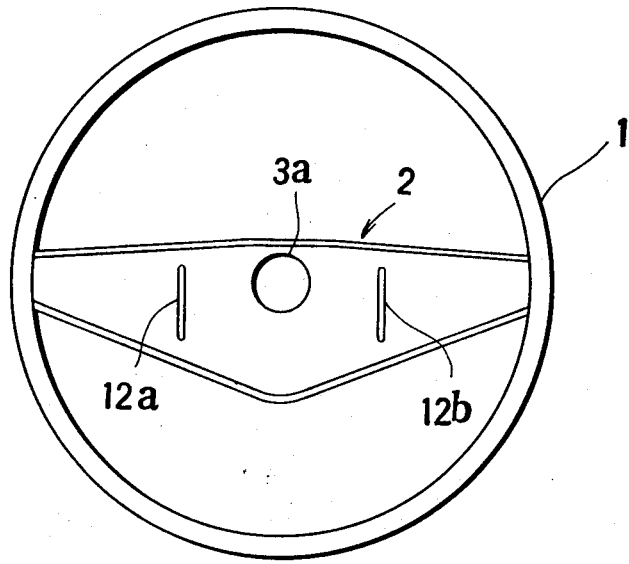
Figure 18A:
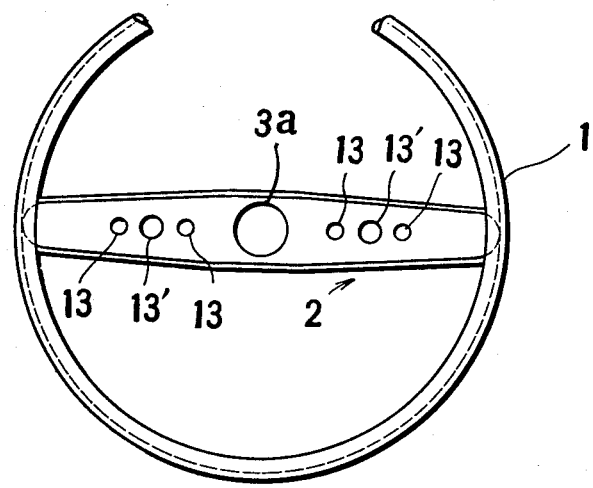
Figure 18B:
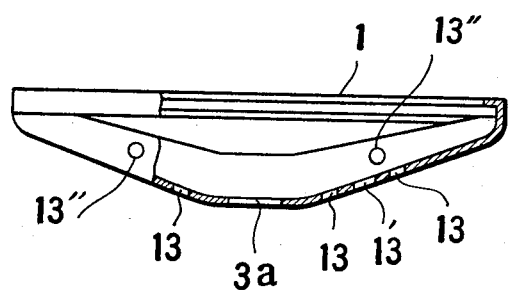
FIG. 18B shows a front view of the steering wheel with a portion of it in FIG. 18A cross-cut.
Figure 19:
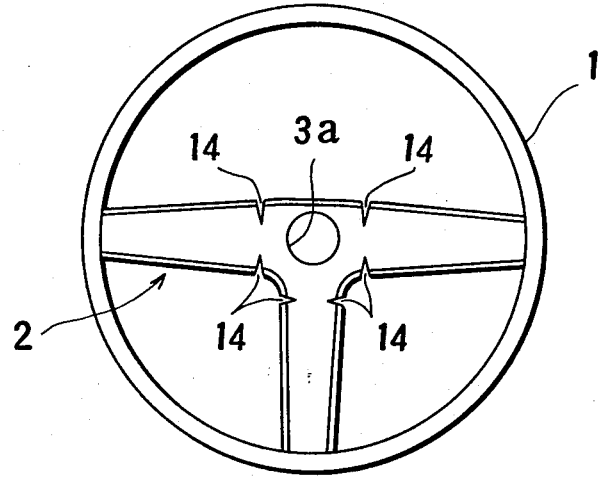
Figure 20:
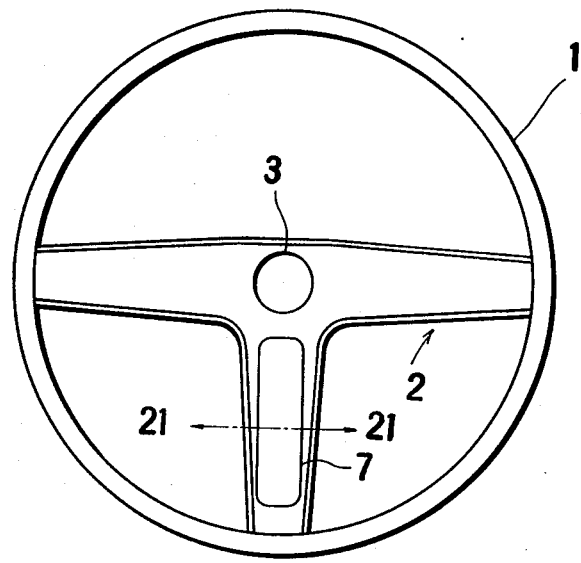
FIG. 20 shows a plan view of the steering wheel in which an air-bag is enclosed.

As mentioned above, when the spoke is formed bent or curved in cross-section, the strength of the steering wheel is greatly increased. Accordingly, to avoid personal injury arising from the driver striking the steering wheel in case of car collision, it is necessary to install a safety device to absorb the mechanical shock. This is made possible by making some cuts in prescribed positions of the bent or curved spoke, at the time when the frame of the steering wheel is subjected to the moulding process. Thus the steering wheel in FIG. 16 consists of the spokes 2a, 2b and 2c which form a U-shape and are made integral, and whose ends are connected to the ring 1. These spokes are curved in cross-section, and some cuts, e.g., slits 11a, 11b and 11c, are made in each of the spokes 2a, 2b and 2c respectively, surrounding the boss hole 3a for the steering column of the spoke 2. The steering wheel in FIG. 17 has a beam construction, bent or curved in cross-section; i.e., it is so constructed that a portion of a spoke 2 is broader in the middle and is spun diametrically, with the grooves 12a and 12b, each punched on either side of the boss hole 3a. In the steering wheel in FIG. 18A, the holes 13 and 13' having proper areas are punched on the bottom of the inside of the spoke 2 which is bent or curved in cross-section. Also, on both sides of the spoke additional holes 13" are bored. An example of another type of cut is shown in FIG. 19. A plurality of notches 14 are cut in on both ends of the bottom of spoke 2, or on the upper and the lower ends of the sides of the spoke 2, or on both the bottom and the sides of the spoke 2. The above mentioned cuts are made on the spoke portion; however, they may be made in the ring portion, as well as in the spokes which have shapes other than those mentioned above. In case of a car collision, a steering wheel having an integral frame provided with such a safety device induces, by dint of the load with which the driver is thrown forward due to inertia, a plastic deformation at the positions of the cuts made on the spoke, and instantly absorbs the shock energy, thus protecting the driver from the mechanical shock. In this case, the spokes do not stab the driver, as has been the case with steering wheels of the prior art, in which the welded point of the ring portion and the spoke portion are torn off.

As in another safety device, an air-bag has been utilized. The prior air-bags have been enclosed in the interior of the car, not in the steering wheel, so that when the bag does expand, the steering wheel hinders the effective expansion of the bag; or else, the breaking of the steering wheel, may break the air-bag. Further, the air bags of the prior art have been enclosed in such a position that the bags prevent chiefly the upper half of the driver's body from hitting against the car structure severely, and the protection of the lower half of the body, especially that of the legs, has been neglected.

Figure 21:
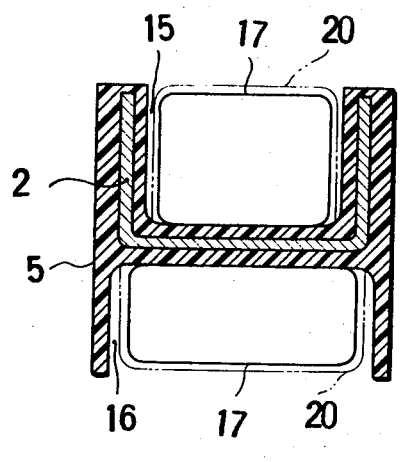
FIG. 21 shows a cross-sectional view of a spoke along the line 21 — 21 in FIG. 20.

The spoke of the steering wheel of this invention being bent or curved in cross-section, provides a suitable place to enclose the air-bags so that these may operate effectively. To be more detailed, in FIG. 21, the cavities or recesses 15 and 16 are formed above and below the spoke 2 by covering the spoke 2, which is so moulded as to have the space bent or curved upwards, with resin 5, in an H-shape, for instance; and the air-bag 17 is enclosed in these cavities 15 and 16.

Figure 22:
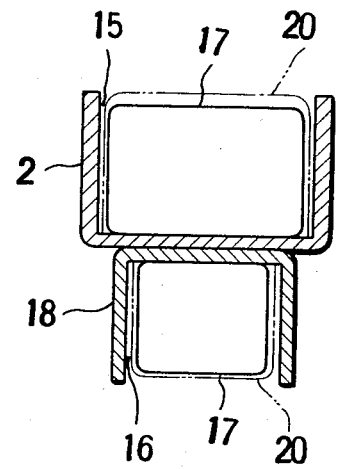
FIG. 22 shows a cross-sectional view of the same portion as shown in FIG. 21, but showing another enclosing means.

In FIG. 22, curved block 18 is fixed onto the lower surface of spoke 2 by proper means, and an air-bag 17 is enclosed in cavity 16 of block 18. It is known that the air-bag is expanded by physical and chemical means by the signal from a sensor means. Part of the bag is fastened within the spoke, and a soft cover 20 is stuffed between the bag and the inner wall of the spoke, and when the bag expands, it takes off from the spoke; by enclosing the air-bag below the lower surface of the spoke, the bag will expand downwards and will protect the legs of the driver effectively.

Figure 23:
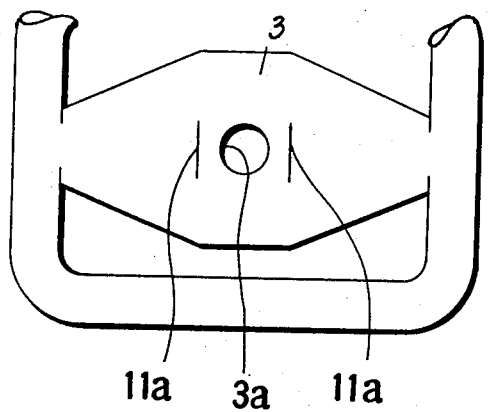
FIGS. 23 and 24 show plan views of the basic material for the frame of the steering wheel having quite a different shape.
Figure 24:
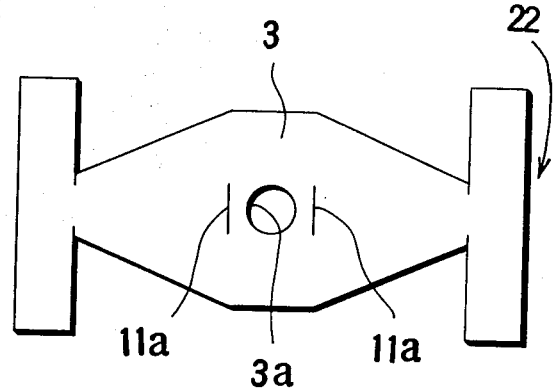

FIGS. 23 through 33 show new shapes of steering wheels. FIGS. 23 and 24 show the flat plate basic materials 21 and 22, punched out by the same arrangement as in FIGS. 1 through 4. The basic materials 21 and 22 are moulded into frames shown in FIGS. 25 and 27, respectively. The steering wheel is moulded into shapes other than the full circular shape from the standpoint of minimum rotation of the wheel and easiness and quickness of response.

Figure 25:
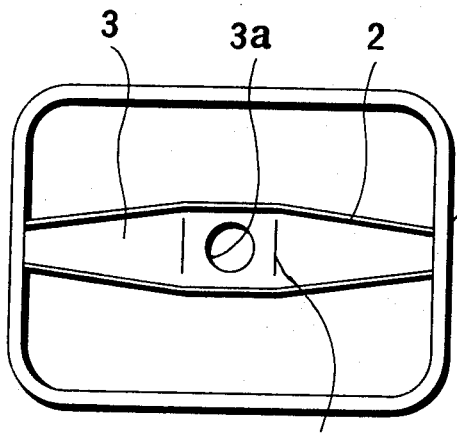
FIG. 25 shows a plan view of a finished wheel frame into which the material in FIG. 23 has been mould processed.

Thus, the steering wheel in FIG. 25 consists of a rectangular and closed grip portion 1' with a main beam, or spoke 2, and the cross-sections of the grip portion 1' and the spoke 2 are moulded into various shapes, having prescribed cross-sectional coefficients; besides, the cuts and the safety device are made on the spoke by the same means as already mentioned, which is an item common to all the following embodiments; and in the space of the grip portion or the spoke portions the various switches and buttons belonging to the handling instruments are installed, e.g., a switch for the constant running speed, a horn-button, a direction-indicator switch, a dim-light switch, etc. The integral moulding processed frames are made of stainless metal, or else subjected to stain-proof or other finishing processes, and the products are finished in their perfect state; however, a part of the grip 1', or else all of grip 1', may be covered with synthetic resin or other coating materials for perfection.

Figure 27:
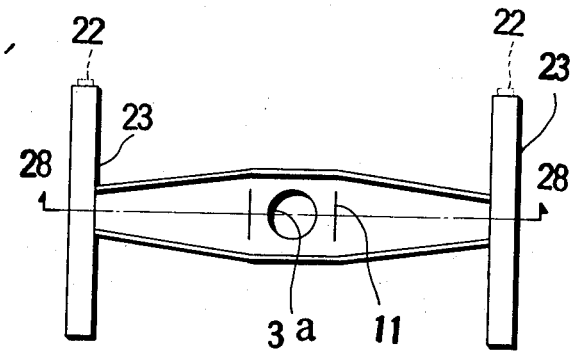
FIG. 27 shows a plan view of a finished frame made of the basic material shown in FIG. 24.
Figure 26:
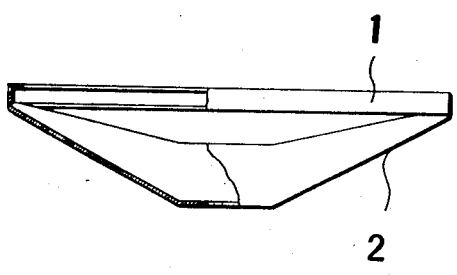
FIG. 26 shows the front view of the wheel shown in FIG. 25, with a portion cross-cut.
Figure 28:
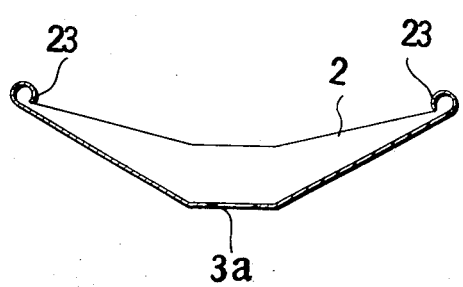
FIG. 28 shows a cross-sectional view of the wheel cut by the line 28 — 28 in FIG. 27.

FIG. 27 shows an example of a steering handle with the grip portion 23 moulded in a parallel position, on both ends of the spoke 2, although in the prior art a core metal has been used in the grip portion; however, in this moulding process the grip portion is hollow, so that this hollow portion may be utilized in such a way for the various parts of the handling system, the push-button type alternate switch for rotation of the steering wheel and other parts 22 may be enclosed therein. FIG. 29 shows an example in which the grip portion 24 is integrally fixed, like a double bow, to both sides of the circular portion which corresponds to the spoke, or to the boss portion 3 while the circular portion may be formed in such a way as having a bent or curved cross-section, with the various instruments installed in the recess of the said circular portion. In FIG. 30, two parallel arcs are fastened to the lower part of the potion which corresponds to the boss portion 3, with both ends connected with two straight lines, thus forming the grip portion 26, and the two spokes 2 are spun between the two parallel arcs. In FIG. 31 a rectangular grip-portion 27 having a bent or curved cross-section is formed in the lower part of the boss portion 3, and the grip portion 27, or at least the grips on both sides, may be filled with synthetic resin or other materials 5', while the various instruments are enclosed in the other space of the grip portion.

In FIG. 32 a grip portion 28, segmental circular in shape, is formed around the boss portion 3, and connected to the central boss portion by the main spoke 2, while both ends of the grip portion 28 are connected to the boss portion 3, forming auxiliary beams.

In FIG. 33 the spokes 2 extend from both sides of the boss portion 3; both ends of the spokes are connected to the semi-circular grip portion 29.

The above-mentioned steering wheels which consist of grip portions including non-circular portions, are so shaped that they decrease the effort of the driver handling action. Besides, these handles can be moulded from a flat plate material; thus the manufacturing processes are greatly simplified; accordingly, mass production becomes possible.

I claim:

1. In a steering wheel for a motor vehicle comprising a light integral frame made of flat basic material, with ring, spoke and boss portions, the ring portion having a required bent or curved cross-section; the spoke portion has a concave-convex, bent or curved cross-section, the spoke portion being provided with cuts to absorb the mechanical shocks; and the boss portion having an aperture for the boss; the improvement therein, wherein the said spoke portion, the said ring portion and the boss portion define a space therein to enclose required driving instruments, and at least part of said ring portion is coated with a covering material, and further, the said ring portion is formed into a non-circular shape.

2. A steering wheel as claimed in claim 1 including an air-bag case in said spoke portion so disposed that said air-bag case breaks or splits away at the time of the expansion of an air-bag therein.

* * * * *

UNITED STATES PATENT OFFICE
CERTIFICATE OF CORRECTION

Patent No. 3,714,844                    Dated February 6, 1973

Inventor(s) Jo Tsuda

It is certified that error appears in the above-identified patent and that said Letters Patent are hereby corrected as shown below:

On the cover sheet, [73] should read as follows:

-- Masakazu Inagaki and Jo Tsuda --.

Signed and sealed this 30th day of April 1974.

(SEAL)
Attest:

EDWARD M.FLETCHER,JR.
Attesting Officer

C. MARSHALL DANN
Commissioner of Patents